United States Patent [19]

Dubourg

[11] 4,242,200
[45] Dec. 30, 1980

[54] FILTERS FOR PURIFYING FLUIDS CONTAINING FERROMAGNETIC PARTICLES

[75] Inventor: Michel Dubourg, Le Mesnil Saint Denis, France

[73] Assignee: Framatome, Courbevoie, France

[21] Appl. No.: 81,092

[22] Filed: Oct. 2, 1979

[51] Int. Cl.³ .............................................. B01D 35/06
[52] U.S. Cl. .................................... 210/222; 210/251; 210/411; 210/420; 210/456
[58] Field of Search ................. 210/222, 223, 42, 251, 210/411, 420, 456

[56] References Cited

U.S. PATENT DOCUMENTS

| 2,398,725 | 4/1946 | Schutte | 21/223 |
| 2,452,220 | 10/1948 | Bower | 210/222 |
| 2,607,492 | 8/1952 | Anders | 210/222 |

FOREIGN PATENT DOCUMENTS

| 2909017 | 9/1979 | Fed. Rep. of Germany | 210/223 |
| 2914497 | 10/1979 | Fed. Rep. of Germany | 210/222 |
| 1204324 | 9/1970 | United Kingdom | 210/222 |

Primary Examiner—Theodore A. Granger
Attorney, Agent, or Firm—Haseltine, Lake & Waters

[57] ABSTRACT

A filter for purifying a fluid containing ferromagnetic particles, e.g. water in the primary circuit of a nuclear reactor using pressurized water, comprises a cylindrical envelope containing steel beads and provided with a coil for magnetizing the beads. The beads are supported in a cylindrical basket located in the cylindrical envelope and the side wall of which is perforated in certain zones. Deflectors are arranged within the basket radially opposite the perforated zones of the basket side wall. Fluid to be purified enters through a central drip tube which is provided with radial perforations in zones radially opposite the deflectors which serve to prevent fluid passing through the beads in a solely radial direction.

7 Claims, 4 Drawing Figures

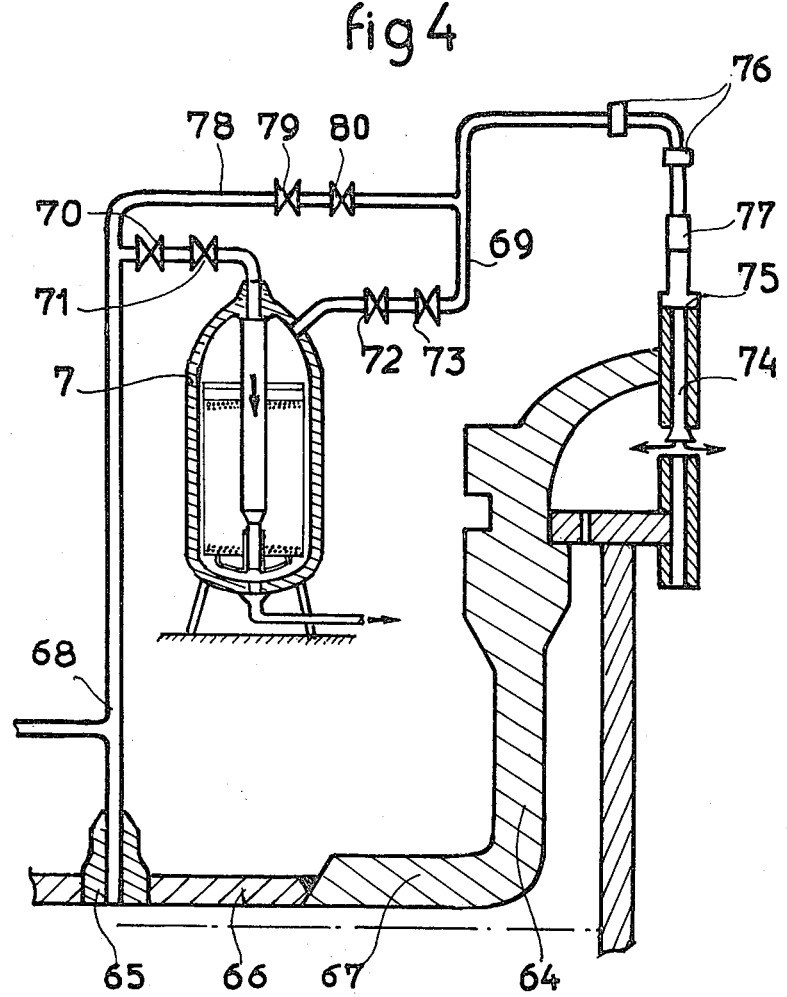

FILTERS FOR PURIFYING FLUIDS CONTAINING FERROMAGNETIC PARTICLES

The invention relates to improvements in filters for purifying fluids containing ferromagnetic particles and more particularly for purifying the primary fluid of a nuclear reactor using pressurised water.

In reactors using pressurised water, the pressurised water, which constitutes the primary fluid and which comes into contact with the fuel rods before being sent into the steam generators in order to heat and vaporise the boiler feed water or secondary fluid, becomes charged, during its circulation in the reactor and in the steam generators, with iron oxide particles formed during the prolonged contact of the water with certain steel parts of the nuclear reactor.

It is very important to remove these oxide particles from the primary fluid by means of a filter, in order to prevent the amount of oxide in the primary fluid from becoming excessive and to prevent these particles from becoming activated after having resided in the core and then being deposited on the primary piping, making a significant contribution to the activity and to the contamination of the surfaces.

The particles trapped by the filter can no longer circulate in the primary circuit and the probability of contamination of the operating and maintenance personnel is thus reduced; the personnel can therefore remain near the reactor installations for a longer time without suffering excessive irradiation.

This purification of the primary fluid most of course be carried out while the reactor is in operation in order to ensure continuous purification of the pressurised water.

However problems arise from the fact that this filtration must be effected on pressurised water at high temperature.

In order to effect this purification, it has been proposed to use an electromagnetic filter comprising a cylindrical envelope filled with beads of a ferromagnetic material, particularly steel beads, which is subjected to a magnetisation cycle so that the beads will retain the ferromagnetic particles conveyed by the primary fluid.

An electromagnetic filter of this type, which comprises a coil surrounding the envelope in which the beads are located, in order to create a magnetic field capable of magnetising the beads, is generally arranged in parallel with a primary pump used for the circulation of the pressurised water.

The interior of the cylindrical envelope containing the beads also communicates with an unclogging circuit which is independent of the primary fluid circuit and enables periodic removal of the oxide particles retained by the beads.

A proportion, which is generally of the order of a few per cent, of the primary fluid flow, is diverted to the filter.

It is thus possible to purify the primary fluid continuously without thereby interfering with the circulation of this fluid in the primary circuit and without thermal degradation (cooling) of the fluid, and also to unclog the filter independently of the circulation.

In the electromagnetic filters used hitherto, the stream of fluid to be purified enters through one end of the filter, passes through the layer of steel beads and leaves through the other end of the filter to be recycled into the primary circuit.

The disadvantages of a filter of this type are that the oxide scale tends to be deposited contantly in the same zones of the mass of steel beads, since the fluid circulates along a constant path, and that it is difficult to restrict the circulation rate of the fluid in the bed of beads in order to assist filtration, and at the same time to ensure a maximum circulation rate of the fluid in the filter in order to be certain of achieving effective filtration.

Furthermore, if it is desired to restrict the circulation rate of the fluid in the filter and to increase the path of the passage through the mass of beads, it may be necessary to increase the size of the filter to such an extent that its bulk and its cost become prohibitive.

According to the invention there is provided a filter for purifying a fluid containing ferromagnetic particles, said filter comprising:

a cylindrical envelope having an inlet for connection to an inlet pipe for the fluid to be purified and an outlet for connection to an outlet pipe for the purified fluid;

ferromagnetic beads within said envelope and between which the fluid will, in use, pass a coil surrounding said cylindrical envelope for connection to electric current supply means to produce a magnetic field for magnetising said beads so that said beads will, in use, retain ferromagnetic particles conveyed by the fluid;

an unclogging circuit communicating with the interior of said envelope;

a cylindrical basket for supporting said beads, arranged within said envelope and coaxial with said envelope, said basket being provided with perforations allowing the interior of said basket containing said steel beads to communicate with the space between said envelope and said basket and into which said outlet opens said perforations being provided in zones of the side wall of said basket and at the ends of said basket;

deflectors, arranged within said basket and having solid walls spaced inwardly of said side wall of said basket, and extending over a certain length in the axial direction, in that zone of said basket in which said beads are located; and a central tube which is connected at one and to said inlet and is closed at its other end, and which is directed along the axis of said filter and arranged in the bed of beads in a central part of said basket, said tube having radially directed lateral perforations for placing the interior of said tube in communication with the interior of said basket in the zones of said tube which are located radially opposite said deflectors, said deflectors being arranged opposite said perforated zones of said side wall of said basket, which zones are located radially opposite said perforations in said central tube, in order to prevent fluid from passing directly, along a solely radial path, from said central tube to said space between said basket and said envelope.

An embodiment of a filter according to the invention, for use in the primary circuit of a nuclear reactor using pressurised water, either in parallel with a primary pump or as an off-take on the cold side of the primary circuit, will now be described by way of example only, with reference to the accompanying drawings.

IN THE DRAWINGS:

FIG. 4 is a section in a vertical plane through a second arrangement of an embodiment of a filter according to the invention, in the primary circuit of a nuclear reactor, as an off-take on the cold side of the primary circuit, with return of the purified water under the cover of the vessel.

FIG. 1 shows part of the primary circuit of a nuclear reactor, comprising two pipes 1,2 of large diameter and a primary pump (not shown).

Figure 1:
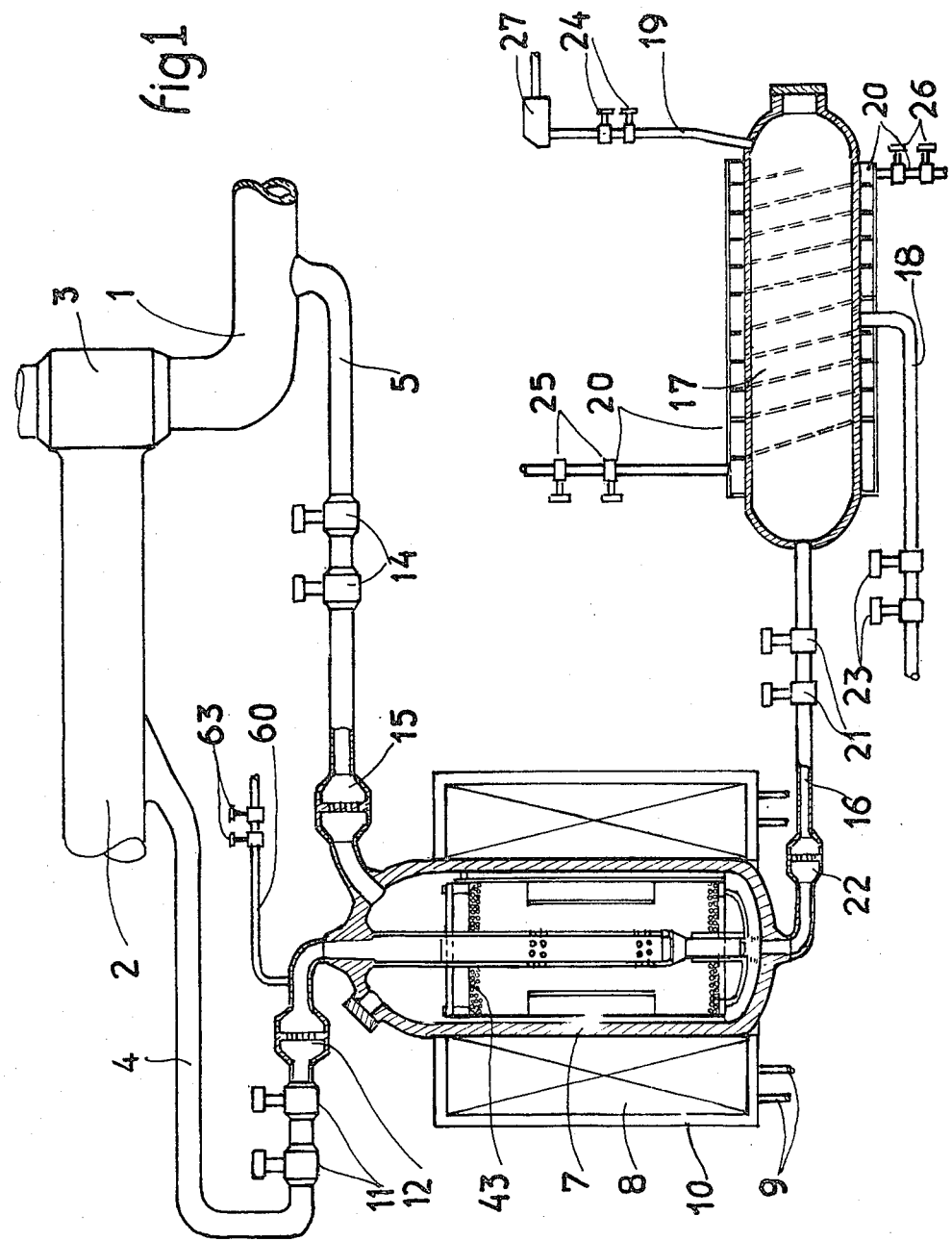
FIG. 1 is a general view of a filtering and unclogging circuit, with a partial section at the level of the filter, with a first arrangement of the filter in parallel with a primary pump in the primary circuit of a nuclear reactor.

Two pipes 4 and 5 are arranged as off-takes on the pipes 1 and 2 and make it possible, respectively, to extract part of the pressurised water constituting the primary fluid, and to recycle this pressurised water into the primary circuit.

The pipe 4 constitutes the inlet pipe for the pressurised water which is to be purified in filter 7, and the pipe 5 constitutes the outlet pipe for the purified fluid coming from the filter.

The filter, which is of cylindrical shape, the structure of which will be described in greater detail with reference to FIG. 2, comprises an envelope which is surrounded, over the greater part of its height, by a magnetic coil 8 for magnetising ferromagnetic material, e.g. steel, beads located inside the envelope. The coil comprises a cooling circuit 9 and a yoke 10.

Motorised valves 11, for isolating the filter 7 from the pipe 2, and a mechanical safety filter 12, provided with magnetic and acoustic detectors, the purpose of which will be specified below, are arranged in the pipe 4.

Likewise, valves 14 and a safety filter 15 are arranged in the pipe 5.

The filter 7 is also connected, at its lower part, to an unclogging circuit comprising a pipe 16, an expansion reservoir 17, a pipe 18 for removing liquid effluents, a pipe 19 for removing gaseous effluents and a circuit 20 for cooling the expansion reservoir.

Motorised valves 21 and a safety filter 22, with detectors, are arranged in the pipe 16.

Valves 23, 24, 25 and 26 are also arranged in the pipes 18 and 19 and the circuit for cooling the expansion reservoir, respectively.

A vacuum pump 27 is also connected to the pipe 19 for discharging the gaseous effluents.

Figure 2:
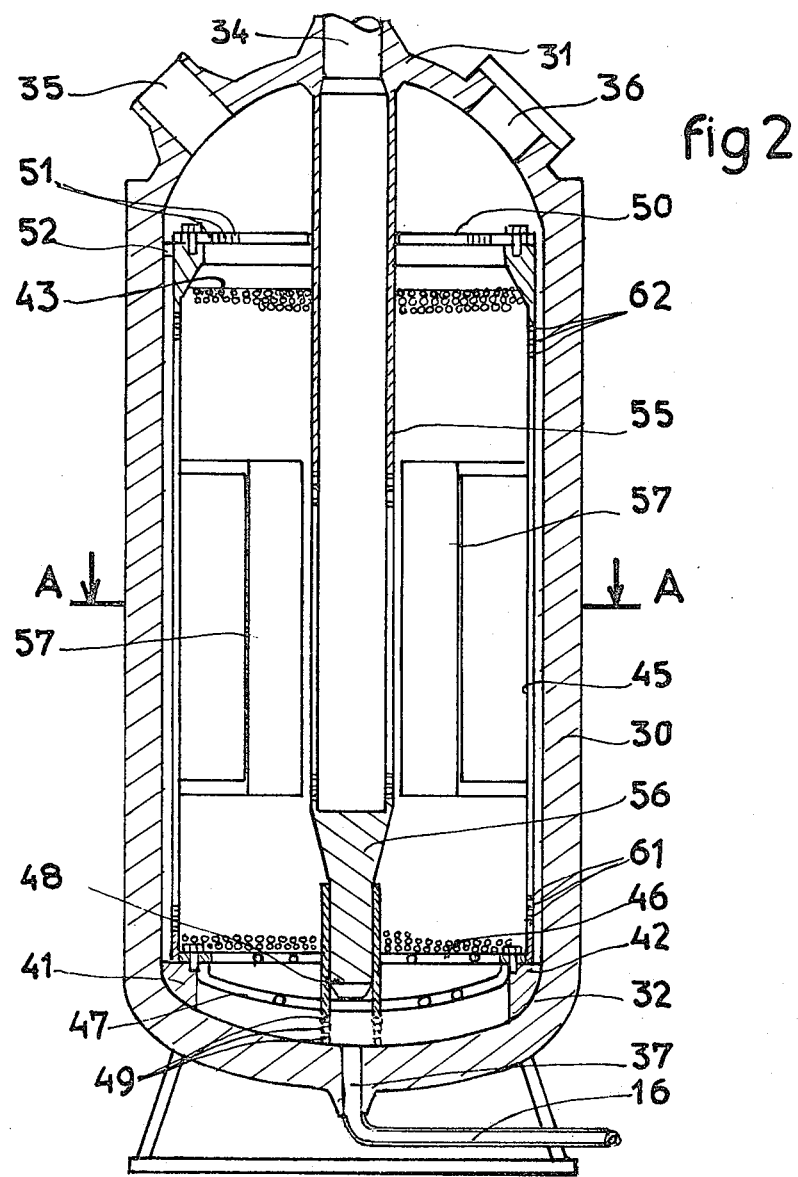
FIG. 2 is a section in a vertical plane through an embodiment of a filter according to the present invention.

With reference to FIG. 2, it is seen that the filter 7 comprises a cylindrical envelope 30 which is closed, at its upper part, by a part-spherical cover 31, and at its lower part, by an elliptical cover 32.

An inlet orifice 34 for the primary fluid and for connection to pipe 4, an outlet orifice 35 for the purified primary fluid and for connection to pipe 5, and an inspection hatch 36 are provided in the upper spherical cover 31.

An orifice 37 is located in the lower elliptical base 32 for connection to the pipe 16 of the unclogging circuit.

The filter is welded to a support 40 which enables the filter to be fixed.

The envelope 30 is made of non-magnetic stainless steel and designed to withstand the pressure and the temperature of the primary fluid (e.g. 155 bars and 286° C. respectively).

The elliptical base 32 of the envelope 30 of the filter comprises radial projections 41 and 42 which constitute fixing feet for a basket 45 inside which the steel beads are located. The beads are made of ferritic chromium steel.

FIGS. 1 and 2 show the upper level 43 of the charge of beads, which rests, at the lower part of the basket 45, on a perforated support plate 46, itself resting on the support feet 41 and 42.

An elliptical base 47, through which perforations extend is also fixed to the lower plate 46 of the basket 45.

Each of the plate 46 and the base 47 possesses, at its central part, a circular opening which makes it possible to introduce and guide it onto a hollow column 48 which is made integral with the elliptical base 32 of the envelope 30 and is arranged vertically to, and coaxially with, the envelope 30, so that the orifice 37 opens inside the column 48.

At its base, the column 48 is provided with perforations 49 which allow the orifice 37, and hence the pipe 16, to communicate with the zone of space between the envelope 30 and the basket 45.

The basket 45 comprises a cylindrical side wall which rests on the supports 41 and 42 at the periphery of the plate 46.

An upper plate 50, through which perforations 51 extend, is fixed to an upper part, of greater thickness, of the side wall of the basket 45.

The spacing between the basket 45 and the envelope 30 is maintained by means of spacers 52 welded to the upper part of the cylindrical basket 45.

The filter 7 also comprises a central tube 55 which is arranged coaxially with the envelope 30 and the basket 45, and inside which the orifice 34 opens.

The central tube 55 is provided with lateral perforations over the entire height of the tube, the perforations being located opposite deflectors 57 fixed to the side wall of the basket 45.

At its lower part, the central tube 55 is closed by a bearing piece 56 which is housed in the upper part of the hollow column 48, for guiding and fixing the central tube in the envelope 30.

Figure 3:
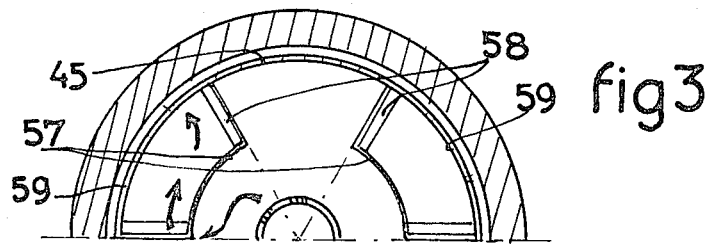
FIG. 3 is a half-section along the line A—A of FIG. 2.

As shown in FIGS. 2 and 3, the deflectors 57 consists of solid walls in the form of cylindrical portions, constituting sectors suspending about 60°, which are fixed to the internal side wall of the basket 45 by means of radial spacers, 58.

The deflectors 57 are thus kept at a certain distance from the inner wall of the basket 45.

Three deflectors are arranged at a uniform distance from the internal wall of the basket 45, leaving between them cylindrical sectors suspending about 60° and which are not equipped with deflectors.

The side wall of the basket 45 is provided with perforations passing through the wall in sectors 59, shown in FIG. 3.

The sectors 59 are bounded by the intersections of the planes of symmetry of the envelope of the filter (that is to say of the planes containing the vertical axis of symmetry of the filter) passing through the extreme generatrices bounding the cylindrical deflectors 57, with the wall of the basket 45. The sectors located between these sectors 59, situated radially behind the deflectors, each consist of a solid wall which completely isolates the basket from the space between the external surface of the basket and the envelope 30.

The basket 45 also possesses a few perforations 61 and 62 at the ends of the vertical side wall, allowing the interior of the basket to communicate with the zone between the basket and the envelope 30.

The perforations made in the basket and in the central tube have a diameter which is such that the beads, even when they are slightly eroded, cannot pass through the perforations. Furthermore, the perforations are located in a uniform array inside grooves machined on the external surfaces of the walls through which the perforations pass.

The operation of the above described filter will now be described.

A certain proportion of the primary fluid flow at the outlet of the pump is diverted from the pipe 2 into the pipe 4. This proportion is of the order of 2 to 4% of the total primary fluid flow in the pipe 2.

With the valves 11 open, the pressurised water constituting the primary fluid is introduced through the orifice 34 into the central tube 55 of the filter 7. This pressurised water leaves the central tube 55 through the perforations in the tube over a certain height within the bed of beads filling the basket 45 surrounding the central tube. The pressurised water thus penetrates into the bed of beads in an initially radial direction.

The magnetisation coil is supplied with direct current and operates continuously to maintain a predetermined level of magnetisation of the beads. The feed current required to magnetise the beads is standardised by determining that current which creates a field of 1,800 Oersted in the absence of beads in the basket.

Before leaving the filter, the fluid coming into contact with the magnetised beads leaves behind, on the beads, the ferromagnetic oxide particles which it may contain.

It is seen that the path of the water from the tube 55, which is initially radial, leads the water either into contact with the deflectors 57 or into contact with the solid sectors of the wall of the basket 45, located between the zones sectors 59.

Thus, the water cannot leave the basket, and its path curves to follow the walls of the deflectors or of the solid sectors, either in the horizontal direction, or in a vertical direction, or along a complex path, until it arrives in the zones between the deflectors and the internal wall of the basket 45, from which zones the water can pass into the space between the basket and the envelope 30 through the perforations in the wall behind the deflectors 57.

Part of the water can also leave the basket 45 through the perforations in the cover 50 or in the plate 46 and in the cover 47, or also through the perforations 61, 62 provided at the lower and upper ends of the side wall of the basket 45, beyond the zone occupied by the deflectors 57. The water thus eventually arrives either in the zone between the basket 45 and the envelope 30 or also in the upper part of the filter and passes out through orifice 35 and outlet pipe 5, which permits the recycling of the water into the primary circuit. The pressurised water is thus directed in all cases towards the upper part of the filter and leaves through the orifice 35 and the pipe 5.

In all cases, the water can only leave the basket after a complex and relatively long path, the water passing through the filter in various directions. The bed of beads is thus utilised in its entirety for purifying the water.

The deflectors are designed in such a way that the speed of diffusion of the primary fluid through the bed of beads does not exceed 50 cm per second.

In a particular case of a nuclear reactor using pressurised water to which a filter as described above was applied, the water of the primary circuit to be treated was at a temperature of 286° C. and at a pressure of 155 bars. The various elements of the filter were therefore designed and envisaged to withstand these conditions.

Under these operating conditions, the filter was designed to treat a maximum water flow of 255 liters per second.

After the filter has been operating for a certain time under constant operating conditions, it is necessary to carry out a certain amount of unclogging in order to remove the oxide particles which have been retained by the beads. To do this, the filter 7 is isolated from the primary circuit by closing the valves 11 and 14, the filter then being filled with water at 286° C. under 155 bars, and the valves 21 are opened, making it possible for the filter to communicate with the expansion reservoir 17 after having purged the expansion reservoir, by means of the vacuum pump 27, of the air which was present therein, and after having demagnetised the charge of beads by programming the current variation and by reversing the polarity at the magnetisation coil.

Of the two valves 21 which make it possible to isolate the expansion reservoir from the filter, one also makes it possible to expand the pressurised water present in the filter. The arrangement and the volume of the expansion reservoir, relative to the filter, are designed in such a way that, on completion of one expansion operation, the steam remains in the filter and the water charged with active effluents remains in the expansion reservoir, which facilitates the cooling and the rapid depressurisation of the active liquid effluent.

At the moment when the valves are opened, an expansion therefore takes place, during which the beads in the filter are scavenged by a water/steam emulsion formed by expanding the pressurised water, and on completion of which the greater part of the water present in the filter has passed into the condenser whilst the filter has filled with steam at a pressure of 55 bars, the temperature after expansion being 270° C. The expansion reservoir is then isolated from the filter by closing the valves 21 and the cooling of the expansion reservoir is started by opening the valves 25 and 26. The temperature of the expansion reservoir is then lowered from 270° C. to 80° C. The filter is then filled with water from unclogging circuit 60 by opening valves 63. This unclogging water is at a temperature of 250° C. and the pressure in the filter after filling is 150 bars. The expansion reservoir is then emptied, when its pressure and its temperature have dropped to an acceptable level, by opening the valves 23 of the circuit for removing the liquid effluents and the valves 24 of the circuit for removing the gaseous effluents, and by starting up the vacuum pump 27.

A second expansion in the filter is then carried out by repeating the same operations as above, this second expansion being followed by a third expansion under the same conditions.

At the end of the unclogging operation, the filter is filled with water at 150 bars and 250° C. by means of the unclogging circuit, and the charge of beads is remagnetised by passing a current for 1 to 2 minutes, the current determined by standardisation being such that it creates a field of 3,200 Oersted in the absence of beads in the filter, and the intensity is then adjusted in order to obtain the nominal field of 1,800 Oersted.

During the unclogging operations, the water in the filter can be emptied by virtue of the presence of the perforations 49 located at the base of the column 48 which is made integral with the envelope 30 of the filter 7.

The safety filters 12, 15 and 22 which have been described above, make it possible to protect the installation against migrating substances which can accidentally be displaced with the primary fluid. Magnetic and acoustic detectors, for indicating and recording the presence of such migrating substances in the primary fluid, are therefore associated with these safety filters, at the inlet and at the outlet of the filter, on the circuit for recycling the purified fluid and on the unclogging circuit.

Other types of protection are envisaged, for example protection against heating in the coil, against the opening of the isolation valves of the filter in the event that the filter is not filled with water, and against the opening of these valves in the event of too low a pressure in the filter, and protections leading to the isolation of the filter from the primary circuit at the moment when unclogging occurs or in the event of loss of electrical feed to the coil.

It is seen that, apart from the advantages which the earlier devices already provided, the above described device makes it possible to achieve a more effective filtration of the primary fluid by the fact that the passage of the fluid through the bed of beads can be slowed down and extended by virtue of the location of the perforations in the basket in which the beads are present, and by virtue of the presence of deflectors and also the presence of a central tube which makes it possible to obtain an initially radial path for the primary fluid.

Furthermore, these advantages are gained without the filter being oversize, relative to the previously known filters, it even being possible for its total bulk to be reduced.

Furthermore, the bed of beads is utilised more homogeneously because the fluid passes through it in numerous directions and from various points distributed over the height of the filter.

FIG. 4 shows a modified embodiment as regards the connection of the filtration circuit to the primary circuit. In this embodiment, the filter 7 is incorporated in a filtration circuit comprising a tapping 65 on that section of pipe 66 of the primary circuit, which constitutes the cold side of this circuit, connected to the tube 67 of the vessel 64.

In the extension of the tapping 65, the filtration circuit comprises pipe 68 which terminates in the dip tube of the filter 7, two isolation valves 70 and 71 being interposed. The water leaves the filter through a pipe 69 and is recycled into the vessel, with the interposition of two valves 72 and 73, via one or two spray nozzles, such as 74, passing through one or two passages 75 which are not used but are normally intended for the mechanisms for controlling the clusters of absorbent material.

The nozzles, such as 74, are connected to the pipe 69 via a junction 76 and a distribution circuit 77.

A by-pass line 78 is also provided, which is equipped with two shut-off valves 79 and 80, making it possible to short-circuit the filter.

Between that point on the cold side of the primary circuit where the spray tapping is connected and the top of the vessel, under the cover where the spray nozzles are located, there is a pressure difference which makes it possible for the water to circulate in the filtration circuit.

The tapping which is normally used for spraying the pressuriser is used as the tapping 65.

By using a flow through the spray nozzles of about 1% of the total flow for cooling the core, the temperature of the "dead" volume of the vessel, located under the cover, is maintained in a completely suitable manner.

Moreover, one of the advantages of this particular arrangement of the filtration circuit is that it makes it possible to cool the "dead" volume under the cover of the reactor vessel by means of the device for recycling the purified water.

Such cooling by means of spraying is in any case required and the recycling of the purified water to this point on the vessel makes it possible to carry out this cooling under good conditions. Furthermore, the injection of purified water under the cover makes it possible to avoid the introduction, at this point, of corrosion products suspended in water, and to avoid the inherent disadvantages, namely deposits, the activation of the zone located under the cover and the resulting difficulties in the operation of the mechanisms for controlling the clusters.

It is also possible to use an increased flow for rinsing the "dead" volume under the cover by opening the valves on the by-pass line of the filter.

The invention is not intended to be restricted to the embodiment which has been described, but includes all variants thereof. Thus, it is possible to modify the shape and the arrangement of the deflectors and the position of the perforations in the basket containing the beads, provided that the direct passage of the water to be purified, from the central tube to the space between the basket and the envelope of the filter, by radial displacement, is prevented by means of deflectors of varying shape and arrangement, which can be fixed to the internal wall of the basket.

Two embodiments have been described as regards the connection of the filtrationcircuit to the primary circuit, namely in parallel with a primary pump or intercalated between the cold side and the vessel cover, but a filter according to the invention can be placed in parallel with any member of the primary circuit other than a pump, in which member a sufficient pressure difference is set up because of the circulation of the coolant, such as, for example, a steam generator. It is also possible to envisage connected the filtration circuit in a way which produces a junction between various loops of the reactor.

A filter according to the invention can be associated not only with an installation such as described, which comprises an unclogging circuit with an expansion reservoir, but also with any installation which comprises any type of unclogging circuit communicating with the interior of the envelope of the filter. Finally, although it is of particular value in the case of an installation for purifying the primary fluid of a reactor using pressurised water, a filter according to the invention can be used in other applications, for example for purifying the water of a reactor using boiling water, or for purifying the feed water of any type of thermal installation comprising a boiler.

What is claimed is:

1. A filter for purifying a fluid containing ferromagnetic particles, said filter comprising:

a cylindrical envelope having an inlet for connection to an inlet pipe for the fluid to be purified and an outlet for connection to an outlet pipe for the purified fluid;

ferromagnetic beads within said envelope and between which the fluid will, in use, pass;

a coil surrounding said cylindrical envelope and for connection to electric current supply means to produce a magnetic fluid for magnetising said beads so that said beads will, in use, retain ferromagnetic particles conveyed by the fluid;

an unclogging circuit communicating with the interior of said envelope;

a cylindrical basket for supporting said beads, arranged within said envelope and coaxial with said envelope, said basket being provided with perforations allowing the interior of said basket containing said steel beads to communicate with the space between said envelope and said basket and into which said outlet opens, said perforations being provided in zones of the side wall of said basket and at the ends of said basket;

deflectors, arranged within said basket and having solid walls spaced inwardly of said side wall of said basket, and extending over a certain length in the axial direction, in that zone of said basket in which said beads are located; and a central tube which is connected at one end to said inlet and is closed at its other end, and which is directed along the axis of said filter and arranged in the bed of beads in a central part of said basket, said tube having radially directed lateral perforations for placing the interior of said tube in communication with the interior of said basket in the zones of said tube which are located radially opposite said deflectors, said deflectors being arranged opposite said perforated zones of said side wall of said basket, which zones are located radially opposite said perforations in said central tube, in order to prevent fluid from passing directly, along a solely radial path, from said central tube to said space between said basket and said envelope.

2. A filter according to claim 1, wherein said deflectors comprise of cylindrical sectors arranged coaxially relative to said central tube, the portions of said side wall of said basket which are bounded by planes of symmetry of said envelope passing through the extreme generatrices of said cylindrical sectors and which are located between said deflectors being solid surfaces, the other portions of said side wall of said basket being provided with said perforations.

3. A filter according to claim 1, for purifying a pressurised liquid at high temperature, wherein said unclogging circuit comprises a pipe for supplying said envelope with pressurised rinsing liquid at high temperature, and an expansion reservoir provided with a cooling system and separately connected to the interior of said envelope, via isolation and expansion valves, to pipes for discharging effluent and to a vacuum pump for emptying said expansion reservoir, such that at the moment when said isolation and expansion valves separating said filter from said expansion reservoir are opened, said beads in said basket are scavenged by a liquid/vapour emulsion produced by expanding said pressurised liquid.

4. A filter according to claim 1, for purifying pressurised water from the primary circuit of a reactor using pressurised water, and where the purified water is to be recycled into the primary circuit, comprising a mechanical safety filter for blocking migrating substances of large valume, provided in each of the inlet and outlet pipes connected to said filter.

5. A filter according to claim 1, for purifying pressurised water of the primary circuit of a nuclear reactor, wherein said filter is arranged in parallel with a pump of said primary circuit, so as to treat part of the primary fluid while the reactor is in operation, and valve for isolating said filter from said primary circuit are provided in said inlet and outlet pipes.

6. A filter according to claim 1, for purifying pressurised water of the primary circuit of a nuclear reactor, wherein said filter is arranged in a filtration circuit as an off-take on said primary circuit, between the cold side of this circuit and the cover of the vessel of said reactor, said cover being penetrated by nozzles for spraying purified water at the level of the volume of the vessel located under the cover, and said nozzles are connected to the outlet of said filter so as to bring that fraction of water taken from the primary circuit into circulation in the vessel, after purification.

7. A filter according to claim 6, comprising a by-pass line provided in parallel with said filter and comprises shut-off valves for bringing said filter into service or for bringing it out of service by divertion the primary fluid, passing into said filtration circuit, to said by-pass line.

* * * * *

UNITED STATES PATENT AND TRADEMARK OFFICE
CERTIFICATE OF CORRECTION

PATENT NO. : 4,242,200
DATED     : December 30, 1980
INVENTOR(S) : MICHEL DUBOURG It is certified that error appears in the above-identified patent and that said Letters Patent are hereby corrected as shown below:

In the Heading insert:

[30]   Foreign Application Priority Data

October 5, 1978    FRANCE     Appln. No.: 78-28525

Signed and Sealed this

Nineteenth Day of May 1981

[SEAL]

*Attest:*

RENE D. TEGTMEYER

*Attesting Officer*    *Acting Commissioner of Patents and Trademarks*